United States Patent
Schenk et al.

(10) Patent No.: US 6,396,802 B1
(45) Date of Patent: May 28, 2002

(54) DATA TRANSMISSION METHOD WITH A PLURALITY OF FREQUENCY BANDS

(75) Inventors: Heinrich Schenk, München (DE); Martin Schenk, San Jose, CA (US)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/468,375

(22) Filed: Dec. 20, 1999

Related U.S. Application Data

(63) Continuation of application No. PCT/DE98/01632, filed on Jun. 16, 1998.

(30) Foreign Application Priority Data

Jun. 20, 1997 (DE) .......................................... 197 26 318

(51) Int. Cl.[7] .................................................. H04J 1/00
(52) U.S. Cl. ...................................... 370/208; 370/343
(58) Field of Search ................................ 370/203, 206, 370/208, 319, 344, 480, 343; 375/260, 261, 233, 232, 235, 349, 350

(56) References Cited

U.S. PATENT DOCUMENTS

| | | | |
|---|---|---|---|
| 4,621,355 A | | 11/1986 | Hirosaki et al. |
| 5,228,025 A | | 7/1993 | Le Floch et al. |
| 5,285,480 A | * | 2/1994 | Chennakeshu et al. ...... 375/101 |
| 5,483,529 A | * | 1/1996 | Baggen et al. .............. 375/233 |
| 6,034,993 A | * | 3/2000 | Norrell ........................ 375/232 |

FOREIGN PATENT DOCUMENTS

| | | |
|---|---|---|
| DE | 195 28 068 A1 | 2/1997 |
| EP | 0 729 250 A2 | 8/1996 |
| EP | 0 772 330 A2 | 5/1997 |

* cited by examiner

*Primary Examiner*—Douglas Olms
*Assistant Examiner*—Ken Vanderpuye
(74) *Attorney, Agent, or Firm*—Herbert L. Lerner; Laurence A. Greenberg; Werner H. Stemer

(57) ABSTRACT

The invention relates to a data transmission method in which the data to be transmitted are divided into a plurality of subchannels each with a normal component and a quadrature component that is orthogonal to the normal component. The divided data are transmitted in different frequency bands. The frequency bands are arranged with non-equidistant frequency spacings between one another. An error signal is generated at the reception end for each subchannel both for the normal branch and for the quadrature branch and fed to a corresponding reception filter.

2 Claims, 1 Drawing Sheet

DATA TRANSMISSION METHOD WITH A PLURALITY OF FREQUENCY BANDS

CROSS-REFERENCE TO RELATED APPLICATION

This is a continuation of copending International Application PCT/DE98/01632, filed Jun. 16, 1998, which designated the United States.

BACKGROUND OF THE INVENTION

Field of the Invention

The present invention lies in the telecommunications field. More specifically, the present invention relates to a data transmission method in which the data to be transmitted are divided into a plurality of subchannels and are transmitted in different frequency bands arranged with frequency spacings between one another.

Examples of data transmission methods of this type are multifrequency methods and multitone methods. Such methods are known in principle and defined by the so-called ADSL Standard (ADSL=Asymmetric Digital Subscriber Line, ANSI TI 413-1995).

It is essential to all of the pertinent methods used in the art that the frequency spacings of the individual subchannels are divided equidistantly, beginning from the value zero. Further, they have a frequency spacing of above 1/T, where 1/T denotes the so-called modulation rate and T is the symbol duration of the data transmission system, that is, for example, the bit duration.

If the number of subchannels is predetermined by a power of 2 in such data transmission methods, then at the transmission end and also at the reception end, it is possible to use an IFFT (Inverse Fast Fourier Transformation) and an FFT (Fast Fourier Transformation) algorithm for the filtering. Particularly when there are a large number of subchannels, the use of these transforms allow for a considerable reduction in operations to be performed, such as, in particular, multiplications.

German published patent application DE 195 28 068 describes a data transmission method with a plurality of carrier oscillations, in which data signals are transmitted according to the multifrequency QAM principle. In that process a defined number of successive data bits are respectively subdivided at the transmission end into a plurality of N bit groups. The latter are sampled in a time frame corresponding to the modulation rate fT of the data signals. Amplitude values are then obtained from the samples and used to modulate in each case one of two orthogonal carrier oscillations of the same frequency which are assigned to the N bit groups. In this case— as is customary—the frequency spacing of adjacent carrier oscillations is defined to be in each case equidistant and smaller than the modulation rate. The resultant signals are then superposed additively to form a carrier oscillation mixture to be transmitted. At the reception end, the transmitted carrier oscillation mixture is first filtered selectively for the individual N bit groups. After sampling in that time frame, the data bits belonging to the N bit groups are recovered.

The prior art data transmission method in which the subchannels are arranged equidistantly but with a spacing of below 1/T can only be used in very low-noise channels.

SUMMARY OF THE INVENTION

It is accordingly an object of the invention to provide a data transmission method with a plurality of frequency bands, which overcomes the above-mentioned disadvantages of the heretofore-known devices and methods of this general type and which allows optimal utilization of frequency bands.

With the foregoing and other objects in view there is provided, in accordance with the invention, a data transmission method, which comprises:

dividing data to be transmitted into a plurality of subchannels each with a normal component and a quadrature component orthogonal to the normal component;

transmitting the divided data in different frequency bands arranged at individually non-equidistant frequency spacings between one another; and generating an error signal at a reception end for each subchannel both for the normal component and for the quadrature component and feeding the error signal to a corresponding reception filter.

In other words, the data to be transmitted are divided into a plurality of subchannels and are transmitted in different frequency bands which are arranged with frequency spacings between one another that are chosen such that they are individually non-equidistant. An error signal is generated at the reception end for each subchannel both for the normal path and for the quadrature path and the error signal is fed to a corresponding reception filter.

Thus, in the data transmission method according to the invention, in a complete departure from the previous prior art, the frequency bands are no longer arranged equidistantly but rather are chosen individually. By way of example, the first frequency band may begin at any desired lower cut-off frequency. In addition, in the useful range of a data transmission system, it is possible to provide gaps for frequency bands that, for example, are reserved for another purpose. Thus, for example, it is possible to omit frequency bands for amateur radio and the like.

The data transmission method according to the invention is suitable in a particularly advantageous manner for so-called VDSL (Very high bitrate Digital Subscriber Line) transmission systems, by which data are transmitted in the speed range of approximately 30 Mbit/s in the subscriber loop over a distance of at most approximately 500 to 1000 m.

The method according to the invention allows optimal adaptation to extremely varied requirements with regard to the utilization of a frequency range. In addition, the outlay for transmitter and receiver is dependent only on the data rate, the number of subchannels and the sampling frequency, which is greater than twice the upper cut-off frequency of the transmission system, and not on the individual position of the individual subbands.

In the case of the data transmission method according to the invention, it is readily possible to provide "gaps", as required, in an entire useful range of the transmission system. In this way, it is possible to reliably prevent reciprocal influencing for example with amateur radio bands. It is also possible, as already explained, to define the first frequency band, in accordance with the practical requirements, above channels that may be present and are utilized for a different purpose, for example a voice channel up to approximately 4 kHz, an ISDN basic access channel up to approximately 100 to 150 kHz.

Other features which are considered as characteristic for the invention are set forth in the appended claims.

Although the invention is illustrated and described herein as embodied in a data transmission method with a plurality of frequency bands, it is nevertheless not intended to be limited to the details shown, since various modifications and structural changes may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
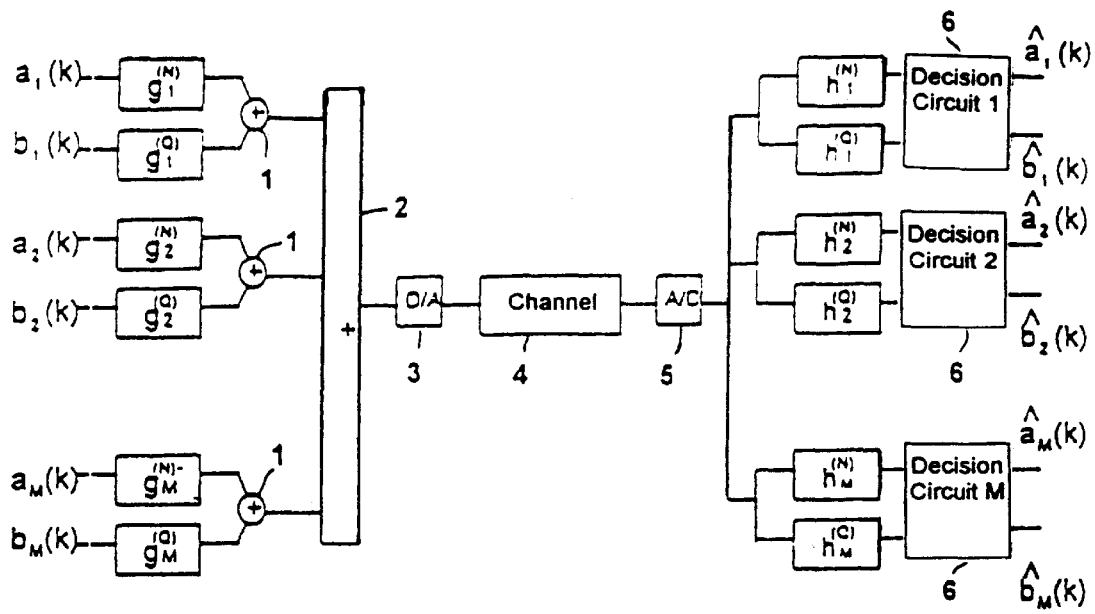
FIG. 1 is a schematic block diagram of circuit configuration for a multifrequency transmission system for carrying out the method according to the invention.

Referring now to the figures of the drawing in detail and first, particularly, to FIG. 1 thereof, there is seen a fundamental circuit design for the transmitter and the receiver of a multichannel transmission system in which the method according to the invention can be employed. There are shown filter pairs $g_1^{(N)}$, $g_1^{(Q)}$ and respectively $g_2^{(N)}, g_2^{(Q)}, \ldots, g_i^{(N)}, g_i^{(Q)}, \ldots, g_M^{(N)}, g_M^{(Q)}$ and $h_1^{(N)}, h_1^{(Q)}$ and respectively $h_2^{(N)}, h_2^{(Q)}, \ldots, h_i^{(N)}, h_i^{(Q)}, \ldots h_M^{(N)}, h_M^{(Q)}$, a respective filter pair being provided for the transmission in one frequency band. In this case, the superscripted index (N) denotes the normal component and the superscripted index (Q) denotes the quadrature component orthogonal thereto. The filter pairs $g_i^{(N)}$ and $g_i^{(Q)}$ are thereby provided at the transmitter end, while the filter pairs $h_i^{(N)}$, $h_i^{(Q)}$ are located at the receiver end. The index i=1,2, ... M. Pairs of values $a_1(k), b_1(k)$ and respectively $a_2(k), b_2(k), \ldots, a_M(k), b_M(k)$ are fed to the transmission filter pairs $g_i^{(N)}$, $g_i^{(Q)}$, in order to obtain samples which, for their part, are summed in summers 1 and 2, respectively, and fed to a digital/analog converter 3. A transmission channel 4 connects the digital/analog converter 3 at the transmitter end to an analog/digital converter 5 at the receiver end. The reception filters $h_1^{(N)}, h_1^{(Q)}, \ldots, h_M^{(N)}, h_M^{(Q)}$ are connected downstream of the analog/digital converter 5 in the signal flow direction. The reception filters provide corresponding samples which are then fed to decision circuits 6, as described, for example, in the above-mentioned German application DE-A-195 28 068.

It is essential to the present invention that the transmission filters $g_i^{(N)}$, $g_i^{(Q)}$ are dimensioned in such a way that a predetermined frequency range is utilized optimally. This is effected in that the frequency spacings of the individual subfilters are no longer divided equidistantly over the entire available frequency range. In particular, the first frequency band may be placed, in accordance with the practical requirements, above channels that may be present and are utilized for a different purpose, for example a voice channel up to approximately 4 kHz, an ISDN basic access channel up to approximately 100 to 150 kHz. In addition, if required, it is possible to provide so-called "gaps" in the entire frequency band, in order to avoid reciprocal influencing as a result of amateur radio bands, for example.

Figure 2:
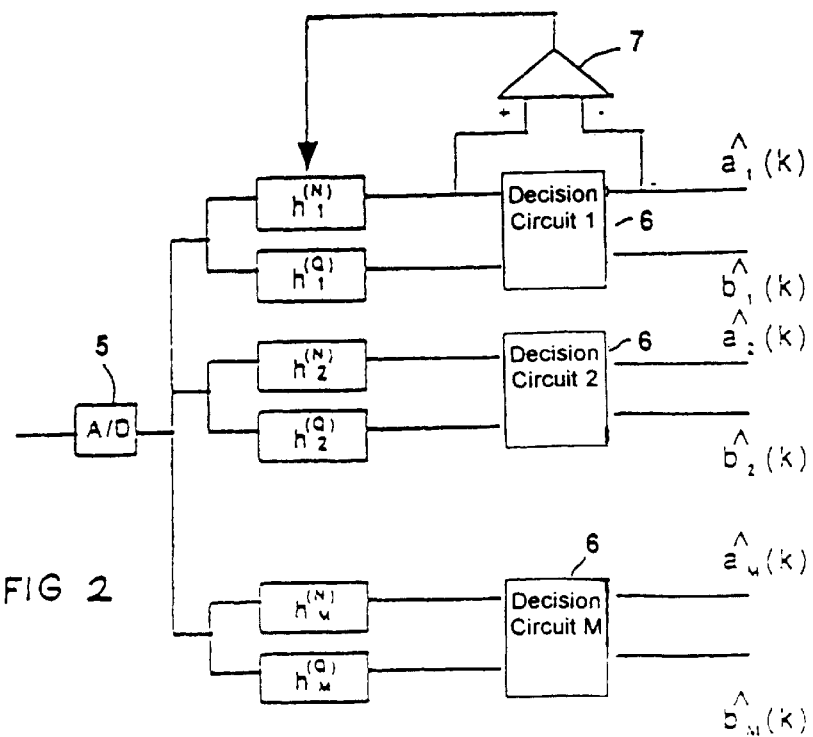
FIG. 2 is a schematic block diagram of a receiver structure of a multifrequency transmission system with adaptively adjustable filter coefficients.

Referring now to FIG. 2, the reception section can be extended in such a way that across each decision circuit 6 for each subchannel, an error signal is generated both for the normal path (cf. FIG. 2) and for the quadrature path. As a result, the coefficients of the reception filters hi can be adjusted automatically during the transmission of digital signals. This is important particularly when the method according to the invention is used in transmission systems in which the properties of the transmission channel 4 are not completely known. The least square error criterion, for example, can be used for the adaptive adjustment of the reception filter coefficients (see, for example, H. Schenk: Entwurf von Sendeund Empfangsfiltern fur den Einsatz in digitalen Modems [Design of Transmission and Reception Filters for Use in Digital Modems], AEÜ, Vol. 33, Issue 11, 1979, pages 425–31). This makes it possible to determine subfilters which are optimally adapted to the transmission channel and the individual frequency bands.

The error signal tapped off across the individual decision circuits 6 is fed to the respective reception filters by the corresponding error elements 7. The reception filters determine the corresponding filter coefficients with the aid of suitable adaptation algorithms. This is readily possible given suitable dimensioning of the transmission filters in which the precise position of the individual frequency bands is defined.

We claim:

1. A data transmission method, which comprises:

dividing data to be transmitted into a plurality of subchannels each with a normal component and a quadrature component orthogonal to the normal component;

transmitting the divided data in different frequency bands arranged at individually non-equidistant frequency spacings between one another;

for each of the plurality of subchannels, supplying the divided data to a reception filter for the normal component and supplying the divided data to a reception filter for the quadrature component;

for each of the plurality of subchannels, supplying an output of the reception filter for the normal component to a respective decision circuit and supplying an output of the reception filter for the quadrature component to the decision circuit;

for each respective decision circuit, generating a first error signal and supplying the first error signal to the reception filter for the normal component and generating a second error signal and supplying the second error signal to the reception filter for the quadrature component.

2. The data transmission method according to claim 1, which comprises, adjusting coefficients of the reception filters for the normal components in dependence on the first error signals and adjusting coefficients of the reception filters for the quadrature components in dependence on the second error signals.

* * * * *